United States Patent
Cooper et al.

(10) Patent No.: US 12,221,218 B2
(45) Date of Patent: Feb. 11, 2025

(54) ENGINE ISOLATION SUBFRAME FOR AIRCRAFT

(71) Applicant: Textron Aviation Inc., Wichita, KS (US)

(72) Inventors: Rory Derik Cooper, Cheney, KS (US); Travis Elliot Smith, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 154 days.

(21) Appl. No.: 18/153,225

(22) Filed: Jan. 11, 2023

(65) Prior Publication Data

US 2023/0227170 A1 Jul. 20, 2023

Related U.S. Application Data

(60) Provisional application No. 63/301,294, filed on Jan. 20, 2022.

(51) Int. Cl.
*B64D 27/40* (2024.01)
*B64D 27/20* (2006.01)

(52) U.S. Cl.
CPC ............. *B64D 27/40* (2024.01); *B64D 27/20* (2013.01); *B64D 27/402* (2024.01)

(58) Field of Classification Search
CPC ...... B64D 27/20; B64D 27/40; B64D 27/402; B64D 27/404
See application file for complete search history.

(56) References Cited

U.S. PATENT DOCUMENTS

| | | | |
|---|---|---|---|
| 7,726,602 B2 * | 6/2010 | Llamas | B64D 27/20 244/54 |
| 9,527,598 B2 | 12/2016 | Whiteford et al. | |
| 9,656,736 B2 * | 5/2017 | Guillemaut | B64C 1/26 |
| 10,829,234 B2 * | 11/2020 | Zameroski | F16F 15/02 |
| 10,967,979 B2 | 4/2021 | Munoz | |
| 11,273,923 B2 | 3/2022 | West | |
| 2011/0168836 A1 * | 7/2011 | Sanz Martinez | B64D 27/14 244/119 |
| 2011/0226894 A1 * | 9/2011 | Lafont | B64D 29/04 244/54 |
| 2016/0046381 A1 * | 2/2016 | Barmichev | B64C 25/34 244/54 |
| 2019/0168883 A1 * | 6/2019 | Buchholz | B64D 27/20 |

* cited by examiner

*Primary Examiner* — Philip J Bonzell
*Assistant Examiner* — Anna L. Gordon
(74) *Attorney, Agent, or Firm* — Avek IP, LLC

(57) ABSTRACT

An engine vibration isolation subframe for aircraft includes a forward frame and a forward beam connected to the forward frame. The forward beam includes a first end configured to connect to a first engine and a second end configured to connect to a second engine. An aft frame is disposed aft of the forward frame and includes a first aft beam connected to the aft frame and the first engine and a second aft beam connected to the aft frame and the second engine, where the second aft beam is disposed substantially opposite the first aft beam. At least one forward isolator assembly is connected to the forward frame and at least one aft isolator assembly is connected to the aft frame.

19 Claims, 4 Drawing Sheets

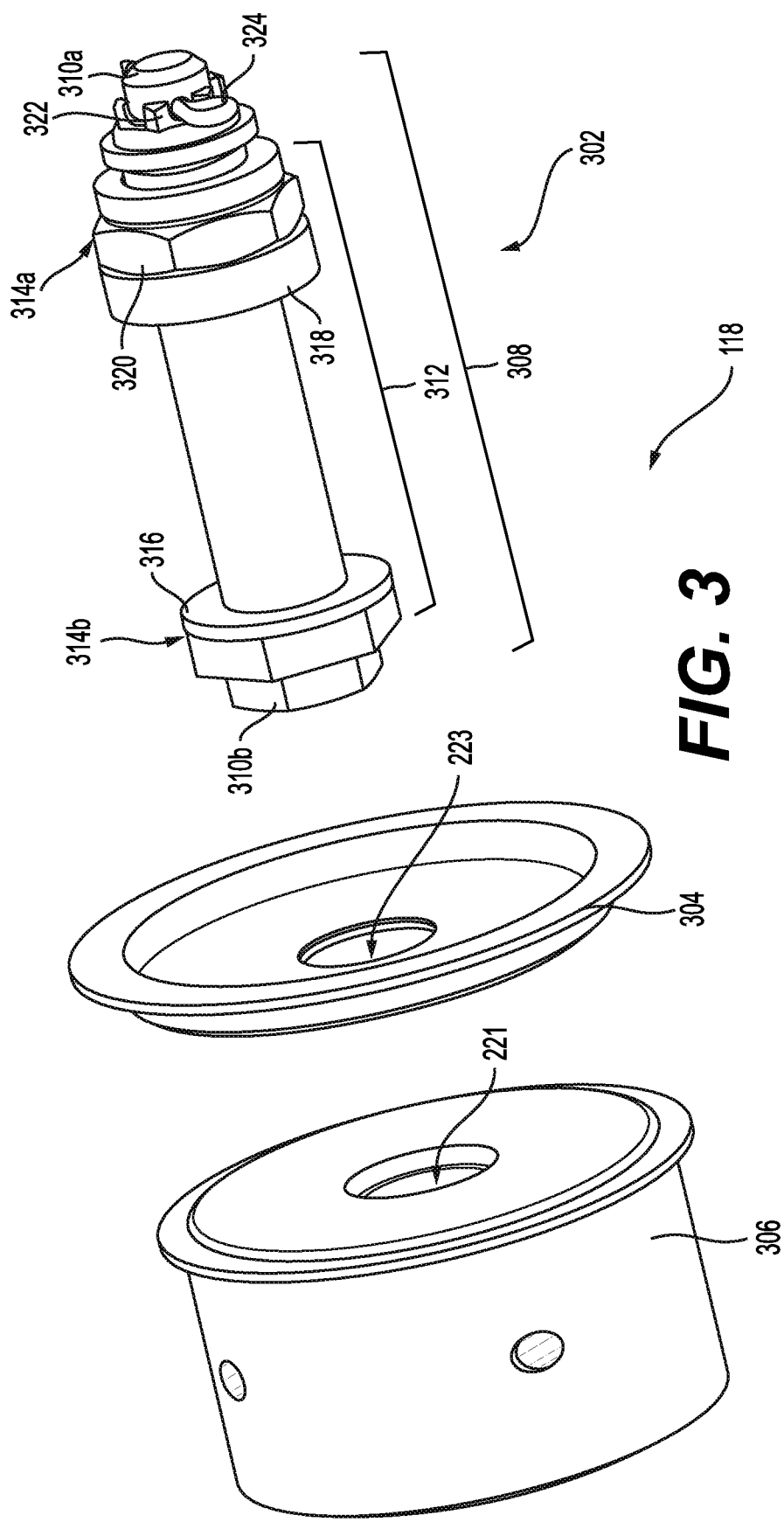

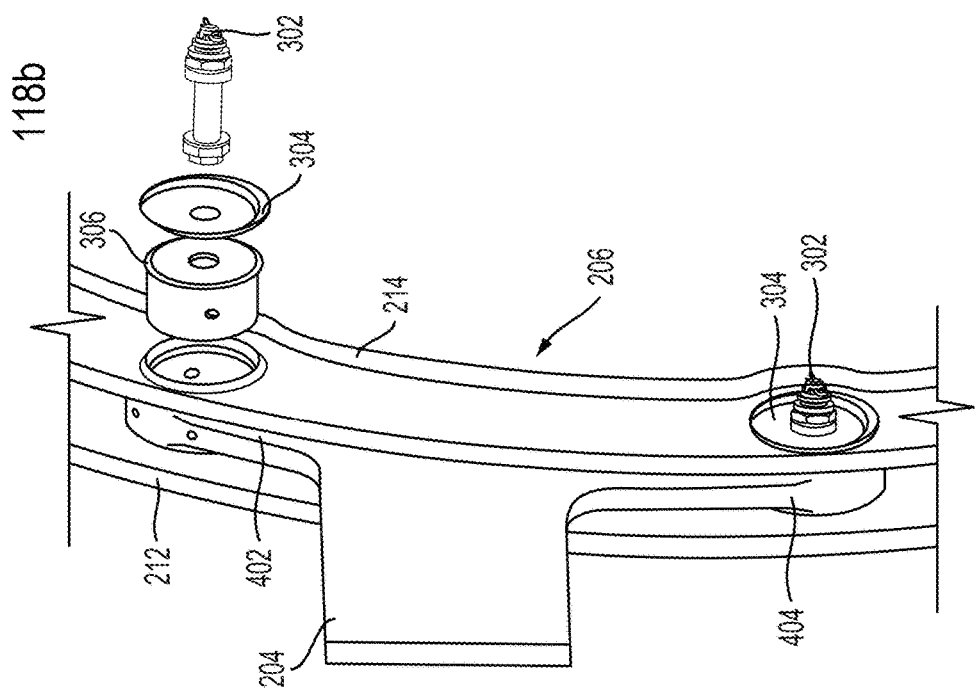
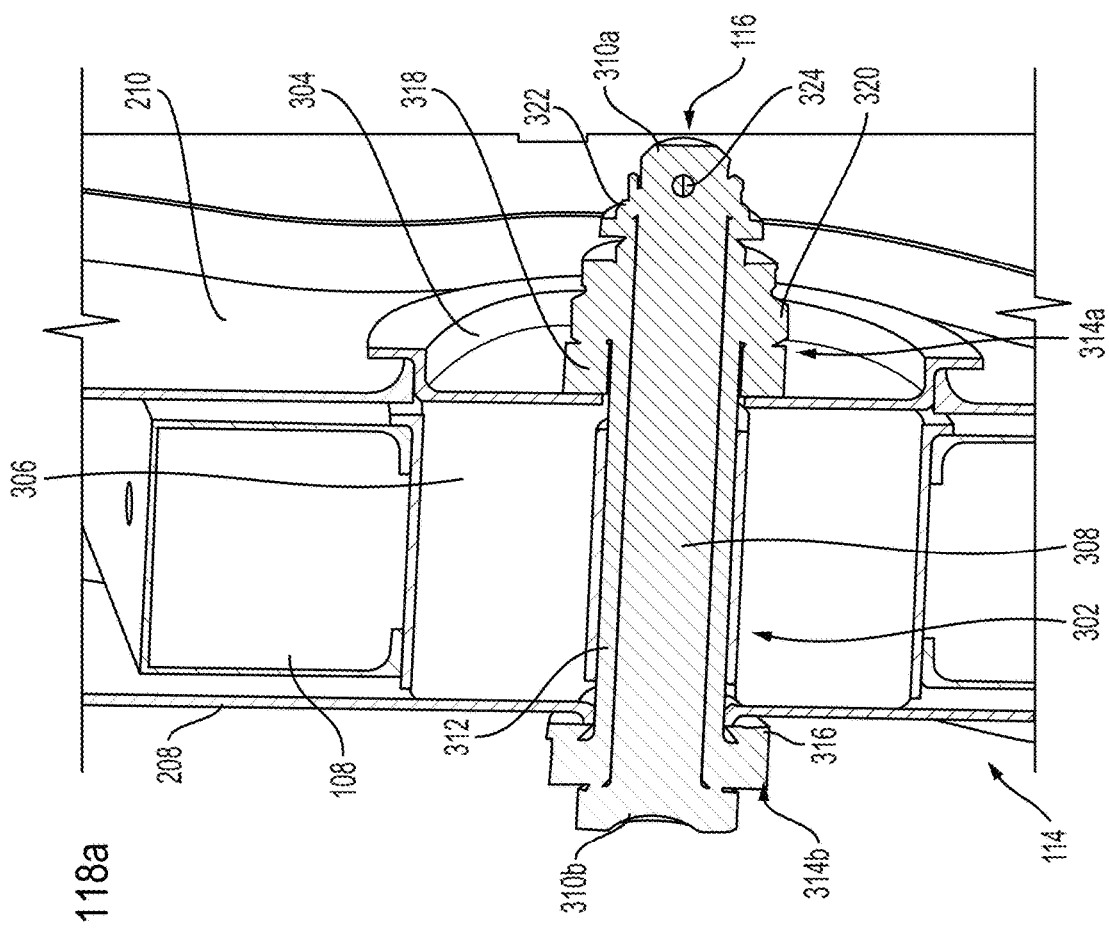

ENGINE ISOLATION SUBFRAME FOR AIRCRAFT

CROSS-REFERENCE TO RELATED APPLICATIONS

This application claims the benefit of priority of U.S. Provisional Patent Application No. 63/301,294, entitled "Engine Isolation Subframe For Aircraft", and filed on Jan. 20, 2022, the disclosure of which is herein incorporated by reference in its entirety.

BACKGROUND OF THE INVENTION

1. Field

The disclosed embodiments relate generally to aircraft engine installations. More specifically, the embodiments relate to an aircraft engine subframe for tail-mounted turbine engines.

2. Description of the Related Art

Many engine mounting systems have been described. For example, U.S. Patent Application Publication No. 2021/0010424 to West discloses a twin-engine mounting system having forward and aft engine support installations coupled to a pylon disposed between the two engines. U.S. Pat. No. 10,967,979 to Munoz discloses rear-mounted engines mounted on top of a horizontal tail plane via pylons to improve efficiency of control surfaces at the rear of the aircraft. U.S. Pat. No. 9,527,598 to Whiteford et al. describes an aircraft engine mounting system that utilizes a curved yoke structure between a first engine mount member and a second engine mount member.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, an engine subframe for aircraft includes: a forward frame; a forward beam connected to the forward frame, wherein the forward beam includes a first end and a second end, the forward beam configured to connect to a first engine at the first end and to a second engine at the second end; an aft frame disposed aft of the forward frame; a first aft beam connected to the aft frame and the first engine; a second aft beam connected to the aft frame and the second engine, the second aft beam disposed substantially opposite the first aft beam; at least one forward isolator assembly connected to the forward frame; and at least one aft isolator assembly connected to the aft frame.

In another embodiment, an engine subframe for providing vibration isolation to an aircraft includes: a forward frame having a first forward plate and a second forward plate; a forward beam disposed between the first forward plate and the second forward plate, wherein the forward beam is arranged transversely across the aircraft for supporting a left engine and a right engine on opposing sides of the forward frame; an aft frame having a first aft plate and a second aft plate; a first aft beam disposed between the first aft plate and the second aft plate, wherein the first aft beam is configured for supporting the left engine; a second aft beam disposed between the first aft plate and the second aft plate, wherein the second aft beam is configured for supporting the right engine; a forward pair of vibration isolator assemblies configured for securing the forward beam between the first forward plate and the second forward plate; a first aft pair of vibration isolator assemblies configured for securing the first aft beam between the first aft plate and the second aft plate; and a second aft pair of vibration isolator assemblies configured for securing the second aft beam between the first aft plate and the second aft plate.

BRIEF DESCRIPTION OF THE SEVERAL VIEWS OF THE DRAWINGS

Illustrative embodiments are described in detail below with reference to the attached drawing figures, which are incorporated by reference herein and wherein:

FIG. 3 shows an exploded view of an isolation assembly for some embodiments;

FIG. 4A illustrates a cross-sectional view of the isolator assembly installed in a forward frame of the engine isolation subframe for some embodiments; and FIG. 4B illustrates the isolator assembly and an aft frame of the engine isolation subframe for some embodiments.

Figure 1:
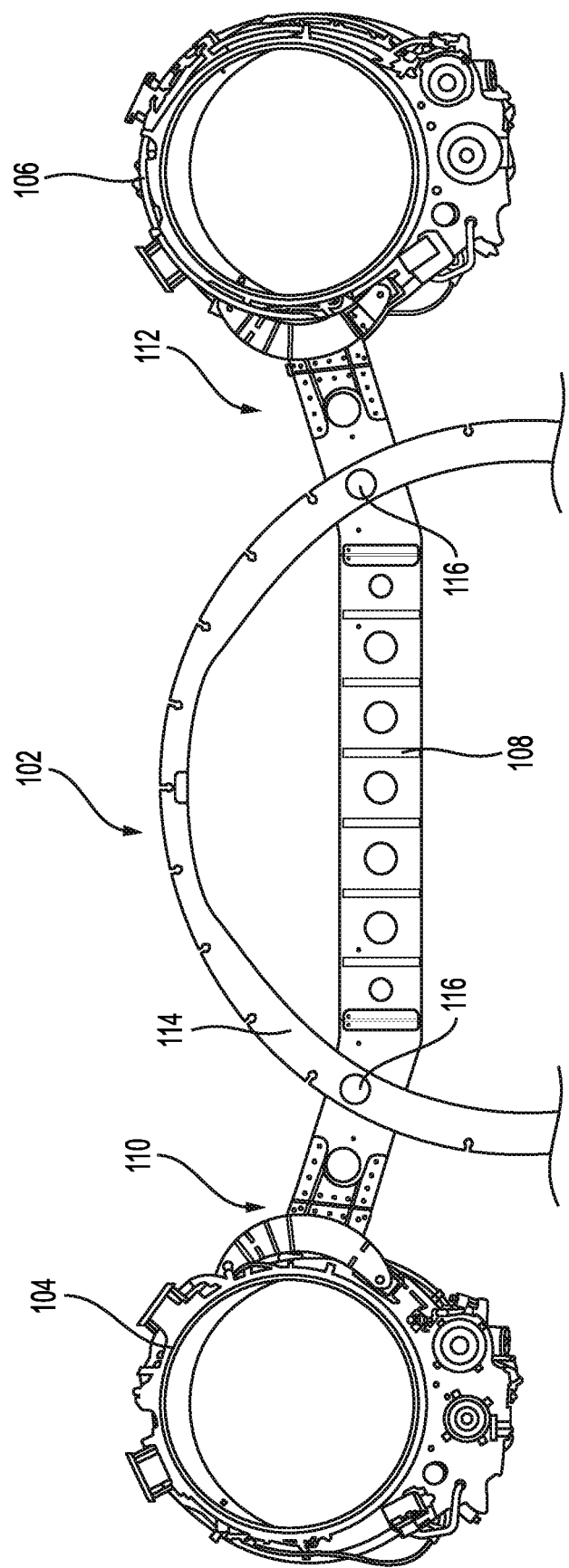
FIG. 1 illustrates a front planar view of an engine isolation subframe for some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aircraft engines transmit vibrations to the aircraft that may lead to noise and customer dissatisfaction. Traditional isolators only damp vibrations at higher frequency while lower frequency vibrations (e.g., low speed shaft or "N1" vibrations) are able to pass through. Such lower frequency vibrations are those often generated by typical aircraft engines. Aircraft having tail-mounted engines, such as business jets, have a cantilevered center of gravity. This cantilevered center of gravity creates difficulty in isolating vibrations from propagating to the airframe, partly because substantial sagging results when soft mounting a cantilevered mass via an isolator material.

Engine mount systems must also be designed to handle shock loading that may occur during engine seizure, or a fan blade-out event to meet federal safety requirements. Additionally, the engine mount systems must be qualified to higher levels to survive vibration loading in the event an engine fails. Still further, aircraft systems rely upon canted exhaust nozzles in one direction for thrust vectoring, resulting in a loss of forward thrust efficiency throughout all phases of aircraft operation.

What is needed is an improved engine mount subframe to reduce vibrations propagated through the aircraft. Further what is needed is an improved engine mount subframe that increases fan blade-out energy dissipation and energy dissipation of windmilling loads after a fan blade-out event such that the overall weight of the aircraft may be reduced. Still further, what is needed is an improved engine mount subframe that increases forward thrust efficiency.

Embodiments disclosed herein are generally related to an engine mount subframe that solves the above-described problems. Elastomeric mounts may be used to isolate the engine beams from the airframe. The engine mount subframe may comprise a forward beam connected at a first end to a first engine and at a second end to a second engine. The first end may be substantially opposite the second end. A forward frame may be connected to the forward beam. An aft frame may be disposed aft of the forward frame and substantially parallel thereto. The forward frame and the aft frame may have an elastomeric mount system integrated therein. The elastomeric mount system may comprise isolation assemblies and may be configured to mitigate vibrations transmitted from the engines. By isolating the engine mount subframe, cabin noise may be reduced. Further, fan blade-out load energy dissipation and energy dissipation of windmilling engine loads after a fan blade-out event may be reduced, allowing for an overall weight reduction in the aircraft. Still further, isolation of the engine mount subframe, by making allowance for the removal of fixed thrust vectoring features, may increase the thrust efficiency of the aircraft, leading to fuel savings or an increase in available payload.

FIG. 1 illustrates a planar view of an engine subframe 102 for some embodiments. Engine subframe 102 may be used to connect engines in tail-mounted engine aircraft. Tail-mounted engine aircraft may comprise a first engine 104 and a second engine 106 disposed in the tail of the aircraft. First engine 104 may be disposed on a right side of the aircraft, while second engine 106 may be disposed on a left side of the aircraft opposite to, and substantially parallel with, first engine 104. In some embodiments, additional engines are present in tail-mounted aircraft, such as an additional engine adjacent to each of first engine 104 and second engine 106.

Figure 2:
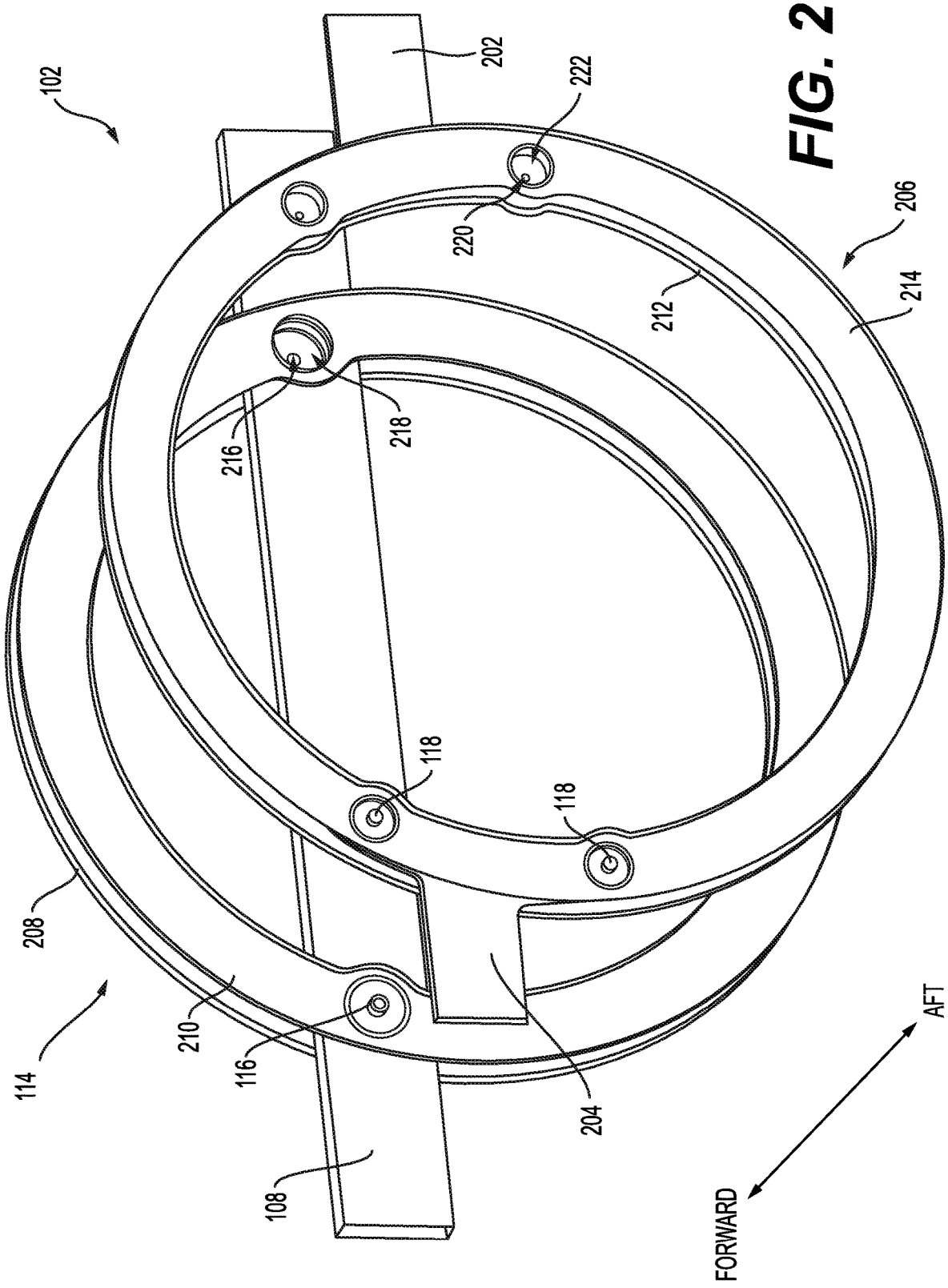
FIG. 2 illustrates a perspective view of the engine isolation subframe for some embodiments.

Engine subframe 102 may mechanically couple first engine 104 to second engine 106 to provide a substantially rigid connection therebetween. Engine subframe 102 may comprise a forward beam 108 connected to first engine 104 at a first end 110 and to second engine 106 at a second end 112. Forward beam 108 is arranged transversely across the aircraft with first end 110 substantially opposite second end 112. In some embodiments, forward beam 108 is monolithic. Alternatively, forward beam 108 may be polylithic. In some embodiments, forward beam 108 is a thin-walled rectangular member. Forward beam 108 may extend through a forward frame 114 as best viewed in FIG. 2. Engine subframe 102 may also comprise aft beams 202, 204 and an aft frame 206 as illustrated in FIG. 2. Forward isolator assemblies 116, depicted in greater detail in FIGS. 2-4B may be inserted through forward frame 114 and forward beam 108 to provide vibration damping for the aircraft. Aft frame 206 may comprise aft isolator assemblies 118 (see FIG. 2) integrated therein to dampen vibrations within the aircraft. Isolator assemblies 116, 118 may form the above-described elastomeric mount system.

FIG. 2 illustrates a perspective view of engine subframe 102 for some embodiments. As shown, aft frame 206 may be disposed aft of forward frame 114 and substantially parallel thereto. A first aft beam 202 and a second aft beam 204 may be disposed in aft frame 206. Aft beams 202, 204 may be substantially parallel to forward beam 108. First aft beam 202 may be coupled to first engine 104, and second aft beam 204 may be coupled to second engine 104. By disposing aft beams 202, 204 at opposite ends of aft frame 206, an open space within aft frame 206 may be created for the aircraft tail cone. Forward frame 114 and aft frame 206 are mechanically coupled to the aircraft through stressed skin, stringers, and/or longerons.

Frames 114, 206 may be substantially circular as shown. Alternatively, frames 114, 206 may be ovular or any other geometric shape to fit within the dimensions of the aircraft. Frames 114, 206 may be substantially similar in size and/or material. In some embodiments, frames 114, 206 comprise carbon fiber composites, steel, aluminum, or alloys thereof. Forward frame 114 may comprise a first forward plate 208 and a second forward plate 210. Aft frame 206 may comprise a first aft plate 212 and a second aft plate 214. In some embodiments, plates 208, 210, 212, 214 are substantially similar in size and/or material. In some embodiments, plates 208, 210, 212, 214 comprise carbon fiber composite, steel, aluminum, or alloys thereof.

Forward frame 114 may comprise two forward isolator assemblies 116. The two forward isolator assemblies may connect plates 208, 210 to forward beam 108. The two forward isolator assemblies 116 may be disposed on opposite sides of forward frame 114 (see FIG. 1). Forward isolator assemblies 116 may be disposed through a first opening 216 in first forward plate 208. Forward beam 108 and second forward plate 210 may comprise a second opening 218 for receiving a fastener 308 (see FIG. 3) of isolator assemblies 116. Fastener 308 may then be secured to an outer face of second forward plate 210 to couple plates 208, 210 to forward beam 108, with forward beam 108 being sandwiched between first and second forward plates 208, 210. FIG. 2 depicts one of forward isolator assemblies 116 installed in first opening 216 and second opening 218, and another of forward isolator assemblies 116 removed from first opening 216 and second opening 218 for clarity of illustration.

Aft frame 206 may comprise two aft isolator assemblies 118 disposed in second aft beam 204 as shown. Two additional aft isolator assemblies 118 may be disposed in first aft beam 202 via a first opening 220 in first aft plate 212 and a second opening 222 in aft beam 202 and second aft plate 214. Aft isolator assemblies 118 may be substantially similar to forward isolator assemblies 116. First aft beam 202 and second aft beam 204 are sandwiched between first and second aft plates 212, 214.

FIG. 3 illustrates a perspective, exploded view of an aft isolator assembly 118 for some embodiments. Aft isolator assembly 118 may comprise a fastener assembly 302, a cap 304, and an isolator 306. In some embodiments, fastener assembly 302 comprises a fastener 308 having a proximal end 310a and a distal end 310b. Fastener 308 may be a screw or a bolt and may be inserted through openings 221, 223 in isolator 306 and cap 304. A sleeve 312 having a proximal end 314a and a distal end 314b may be placed onto fastener 308. Sleeve 312 may be substantially cylindrical and match the profile of fastener 308. Sleeve 312 provides redundant support for an additional safety measure for isolator assemblies 116, 118 in the case of failure of fastener 308. A washer 316 may be disposed on an outer surface of sleeve 312 near distal end 314b. In some embodiments, washer 316 abuts against first aft plate 212 as described above. Near proximal end 314a, a spacer 318 may be disposed on an outer surface of sleeve 312. A nut 320 may be placed towards proximal end 314a and abut against a top surface of spacer 318. Spacer 318 and/or nut 320 may be disposed on the outer surface of sleeve 312. A castle nut 322 may abut against a top surface of nut 320 and comprise an opening through which a pin 324 may be inserted therethrough. Castle nut 322 may be placed on an outer surface of fastener 308 near proximal end 310a. In some embodiments, pin 324 is a cotter pin 324. It should be noted that the illustrated arrangement of pins, nuts, spacers, and washers for sleeve 312 is not meant to be limiting, and any combination of fasteners to provide a failsafe for fastener assembly 302 is considered within the scope of embodiments described herein.

Cap 304 may secure isolator 306 within aft frame 206. In some embodiments, cap 304 comprises a diameter of about 5 inches to about 6 inches. Isolator 306 may comprise an elastomer for damping vibrations from engines 104, 106. In some embodiments, the elastomer comprises rubber, synthetic rubber, silicone, vinyl, thermosets, or any other polymeric material having a relatively low elastic modulus. Isolator 306 may be configured to provide a predetermined amount of vibration isolation based on a type of isolator material, material amount, elastomer life, elastomer strength, and the like according to each specific use case. In some embodiments, isolator 306 may be configured to provide thrust vectoring in the case of failure of one of engines 104, 106. By using isolator 306, the N1 vibrations transmitted to the aircraft may be substantially reduced. In some embodiments, isolator 306 is snubbed at a maximum deflection limit. In some embodiments, aft isolator assembly 118 may be configured by tuning isolator 306 such that a linear range of motion may be approximated for aft frame 206, thereby providing a substantially similar linear motion to forward frame 114. In some embodiments, isolator 306 has a spring rate of about 4,000 lbf/in. The spring rate is tuned to minimize the natural frequency of the engine mount system. Sizing of isolator 306 is then determined by the elastic modulus of the material, the strength of the material, and the desired life limit of the assembly. Isolator 306 may comprise an inner diameter of about 0.75 inches to about 1.5 inches and an outer diameter of about 5 inches to about 7 inches. In some embodiments, isolator 306 comprises a height of about 2 inches to about 3 inches.

FIG. 4A illustrates a cross-section of a forward isolator assembly 116 integrated with forward frame 114 for some embodiments. Forward isolator assembly 116 is an example of aft isolator assembly 118 described above in connection with FIG. 3. Items enumerated in the drawing figures with like numerals are the same or similar and their description may not be repeated accordingly. As described above, fastener 308 may extend through openings 216, 218 in forward beam 108, cap 304, and isolator 306 and be secured to second forward plate 210. The use of isolator 306 may reduce vibrations transmitted through forward frame 114. As previously described, two forward isolator assemblies 116 may be integrated with forward frame 114. The two forward isolator assemblies 116 may be substantially opposite one another.

FIG. 4B illustrates aft isolator assemblies 118 in conjunction with the aft frame 206 for some embodiments. A first aft isolator assembly 118 may be disposed through openings 220, 222 near a first end 402 of second aft beam 204. As depicted in FIG. 4B, a first aft isolator assembly 118a is shown with an exploded view to better illustrate the internal components. A second aft isolator assembly 118b is shown in FIG. 4B disposed through openings 220, 222 near a second end 404 of second aft beam 204 in an installed configuration for use in aft frame 206. First end 402 extends in a first direction substantially opposite that of second end 404 which extends in a second direction. As shown in FIG. 4B, first and second ends 402, 404 extend substantially perpendicular to second aft beam 204 while matching the curvature of aft frame 206. Aft isolator assemblies 118 in first aft beam 202 may mirror those in second aft beam 204 (see FIG. 2). Similar to forward isolator assemblies 116, the use of aft isolator assemblies 118 may reduce vibrations transmitted from engines 104, 106 through aft frame 206. Such vibration reduction may lead to noise reduction, increased forward thrust efficiency, increases in fan blade-out energy dissipation, increases in energy dissipation of windmilling loads, or any combination thereof.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An engine subframe for aircraft, the engine subframe comprising:
   a forward frame having a first forward plate and a second forward plate;
   a forward beam connected to the forward frame,
   wherein the forward beam comprises a first end and a second end, the forward beam configured to connect to a first engine at the first end and to a second engine at the second end;
   an aft frame disposed aft of the forward frame;
   a first aft beam connected to the aft frame and the first engine;
   a second aft beam connected to the aft frame and the second engine, the second aft beam disposed substantially opposite the first aft beam;
   at least one forward isolator assembly connected to the forward frame; and
   at least one aft isolator assembly connected to the aft frame;

wherein the second forward plate and the forward beam each comprise a pair of openings configured to receive one of the forward pair of isolator assemblies, respectively.

2. The engine subframe of claim 1, wherein the forward frame and the aft frame are each mechanically coupled to the aircraft via one or more of stressed skin, stringers, or longerons.

3. The engine subframe of claim 1, wherein the forward frame and the aft frame are both located in a tail of an aircraft for mounting the first engine and the second engine on opposite sides of the tail.

4. The engine subframe of claim 1, wherein the forward frame and the aft frame are each substantially circular, and the forward frame is substantially parallel to the aft frame.

5. The engine subframe of claim 1, wherein the at least one forward isolator assembly is inserted through the forward frame and the forward beam for connecting the forward frame to the forward beam.

6. The engine subframe of claim 1, wherein the at least one aft isolator assembly comprises:
   a first aft isolator assembly inserted through the aft frame and the first aft beam for connecting the aft frame to the first aft beam; and
   a second aft isolator assembly inserted through the aft frame and the second aft beam for connecting the aft frame to the second aft beam.

7. The engine subframe of claim 6, wherein the aft frame comprises a first aft plate and a second aft plate disposed on opposite sides of the first aft beam and the second aft beam such that the first and second aft beams are sandwiched between the first and second aft plates and connected together via the first and second aft isolator assemblies, respectively.

8. The engine subframe of claim 1, wherein the aft frame comprises an open space therein configured to receive an aircraft tail cone between the first aft beam and the second aft beam.

9. The engine subframe of claim 1, wherein the forward frame comprises a first forward plate and a second forward plate disposed on opposite sides of the forward beam such that the forward beam is sandwiched between the first and second forward plates and connected together via the at least one forward isolator assembly.

10. The engine subframe of claim 1, wherein the at least one forward isolator assembly comprises:
    an isolator comprising an elastomeric material configured for absorbing and damping vibrations, wherein the isolator comprises an opening therethrough; and
    a fastener assembly having a fastener configured for insertion through the opening for fastening the isolator within forward frame and the forward beam.

11. The engine subframe of claim 10, wherein the at least one forward isolator assembly comprises a cap having an opening therethrough, the cap being configured for securing the isolator within the forward frame via the fastener.

12. The engine subframe of claim 10, comprising a sleeve disposed around a shaft of the fastener, wherein the sleeve is configured to provide redundant support in case of failure of the fastener.

13. An engine subframe for providing vibration isolation to an aircraft, comprising:
    a forward frame having a first forward plate and a second forward plate;
    a forward beam disposed between the first forward plate and the second forward plate, wherein the forward beam is arranged transversely across the aircraft for supporting a left engine and a right engine on opposing sides of the forward frame;
    an aft frame having a first aft plate and a second aft plate;
    a first aft beam disposed between the first aft plate and the second aft plate, wherein the first aft beam is configured for supporting the left engine;
    a second aft beam disposed between the first aft plate and the second aft plate, wherein the second aft beam is configured for supporting the right engine;
    a forward pair of vibration isolator assemblies configured for securing the forward beam between the first forward plate and the second forward plate;
    a first aft pair of vibration isolator assemblies configured for securing the first aft beam between the first aft plate and the second aft plate; and
    a second aft pair of vibration isolator assemblies configured for securing the second aft beam between the first aft plate and the second aft plate;
    wherein the second forward plate and the forward beam each comprise a pair of openings configured to receive one of the forward pair of vibration isolator assemblies, respectively.

14. The engine subframe of claim 13, wherein the forward frame and the aft frame are each mechanically coupled to an aircraft frame in a tail of the aircraft for mounting the left engine and the right engine on opposite sides of the tail.

15. The engine subframe of claim 14, wherein the aft frame comprises an opening between the first aft beam and the second aft beam.

16. The engine subframe of claim 13, wherein the forward pair of vibration isolator assemblies, the first aft pair of vibration isolator assemblies, and the second aft pair of vibration isolator assemblies each comprise an isolator having an elastomeric material configured for damping vibrations from the left engine and the right engine.

17. The engine subframe of claim 13, wherein the first forward plate comprises a pair of holes each configured to receive a fastener therethrough for securing one of the forward pair of vibration isolator assemblies within a respective one of the pair of openings.

18. The engine subframe of claim 17, wherein the forward pair of vibration isolator assemblies each comprise a cap secured against the second forward plate via the fastener.

19. The engine subframe of claim 13, wherein the first aft beam and the second aft beam each comprise a first end configured to receive a first vibration isolator assembly and a second end configured to receive a second vibration isolator assembly, wherein the first end extends in a first direction and the second end extends in a second direction substantially opposite the first direction.

* * * * *